United States Patent Office 3,130,185
Patented Apr. 21, 1964

3,130,185
TRIALKYLBOROXINES AS POLYMERIZATION CATALYSTS
Frank J. Welch, Charleston, W. Va., assignor to Union Carbide Corporation, a corporation of New York
No Drawing. Filed Sept. 19, 1960, Ser. No. 56,693
13 Claims. (Cl. 260—88.7)

The present invention relates to the polymerization of ethylenically unsaturated monomers. More particularly, this invention relates to a novel catalytic process for the polymerization of ethylenically unsaturated monomers in which an organoboron catalyst is employed.

Heretofore, it has been known that the polymerization of vinyl monomers, such as vinyl chloride, ethylene and the like, can be catalyzed by contact with the free radicals produced by the thermal decomposition of substances such as peroxides and azo compounds. In general, however, when these free radical-producing compounds are employed, it is essential to carry out the polymerization reaction at above ambient temperature so that the thermal decomposition required for the production of the free radicals will take place to an appreciable extent. Thus, the operating conditions under which the free radical-catalyzed polymerizations can be carried out on a commercial basis are considerably limited. Another disadvantage particularly attending the use in polymerization reactions of peroxide-type free radical-producing compounds, such as benzoyl peroxide, hydrogen peroxide, lauroyl peroxide and the like, lies in the fact that these peroxides, or their residues, may oxidize the polymeric product that is formed, thereby resulting in the discoloration of the polymer as well as engendering other deleterious changes in the properties of the polymer. Such compounds may also alter the color of many dyestuffs commonly added to the reaction mixture after polymerization. It has also been found that many of the free radical-producing compounds are, unfortunately, highly unstable and are necessarily stored at very low temperatures prior to use, or prepared in situ; still others are sensitive to shock and therefore require considerable care in handling.

In addition to the free radical-producing compounds hereinabove described, many other catalysts presently employed in the polymerization of vinyl monomers, such as metal alkyls and mixtures containing metal alkyls in combination with metal halides, engender the formation of polymeric products containing difficultly removable residues. The presence of such residues often prevents the direct utilization of the polymeric products in many applications, as for instance, in the production of films or fibers.

The aforementioned disadvantages can now be overcome to a substantial extent through the practice of the present invention whereby one or more of the following objects can be achieved.

It is a principal object of this invention to provide a novel catalytic process for the polymerization of ethylenically unsaturated monomers. It is another object of this invention to provide novel catalysts for the polymerization of ethylenically unsaturated monomers which are operable over a broad temperature range. A further object of this invention is to provide polymers of ethylenically unsaturated monomers which are essentially devoid of objectionable residues. Still other objects will appear in connection with the following description.

It has now been found that certain monomers containing at least one non-aromatic ethylenically unsaturated group can be polymerized by contacting the monomers under polymerization conditions, as hereinbelow described, with a catalytic quantity of a trialkylboroxine. More particularly, the organoboron compounds suitable for use as catalysts in the processes of this invention are the cyclic anhydrides of monoalkylboronic acids, which are called trialkylboroxines, and which can be represented by the general formula:

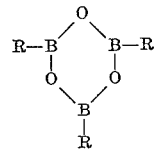

wherein R represents an alkyl radical containing from 1 to about 12 carbon atoms, such as an ethyl, isopropyl, n-butyl, hexyl, octyl, 2-ethylhexyl, decyl, dodecyl radical or the like.

As illustrative of the trialkylboroxines which are contemplated as polymerization catalysts by this invention, there can be mentioned triethylboroxine, tri-isopropylboroxine, tri-n-butylboroxine, tripentylboroxine, tri-2-ethylhexylboroxine, and the like.

The ethylenically unsaturated monomers which can be polymerized by the catalysts of this invention can be defined more specifically as the compounds having the general formula:

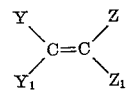

wherein Y and $Y_1$ each designates either a hydrogen or a halogen atom, Z designates a member of the class consisting of hydrogen and halogen atoms and the alkyl radicals, preferably containing from 1 to about 4 carbon atoms, of which methyl and ethyl radicals are especially preferred, and $Z_1$ designates a substituent, i.e. atom or radical, characterized by having a zero or a positive para-sigma value as defined by Hammett ("Physical Organic Chemistry," McGraw-Hill Book Co., 1940, pp. 184–188). As so defined, the para-sigma value of a substituent can be obtained from the equation:

Para-sigma value $(\sigma) = \log K_1 - \log K_1^0$ wherein $K_1$ designates the ionization constant of the benzoic acid derivative containing the substituent in the para-position of the benzoic acid molecule, and $K_1^0$ designates the ionization constant of unsubstituted benzoic acid.

It has been found that the greater the para-sigma value of the substituent designated above by $Z_1$, other factors being constant, the more readily will the ethylenically unsaturated monomer be polymerized by contact with the organoboron catalysts of this invention. Accordingly, the ethylenically unsaturated monomers contemplated by this invention can possess a substituent designated by $Z_1$ having a para-sigma value in the range of from 0 to about +1.3, or even higher. Illustrative of the substituents which have a zero or positive para-sigma value, to mention but a few, are —H, -halogen, —$C_6H_5$, —CN, —COOH, —COOR', —COR', —CONH$_2$, —CONR'$_2$, —OCOR, and —SOOR', wherein R' designates an alkyl, alkoxyalkyl, cyanoalkyl or haloalkyl radical, preferably containing from 1 to about 18 carbon atoms or slightly higher. Among the substituents which, on the other hand, do not have a positive or zero para-sigma value are the alkyl and alkoxy radicals. It has also been found of critical importance to this invention that the substituent designated by $Z_1$ have a positive para-sigma value of at least about 0.4 when Z designates an alkyl radical, other ethylenically unsaturated monomers ordinarily being inoperable in the process of this invention. Thus, when Z designates an alkyl radical, $Z_1$ can be —CN, —COOH, —COOR', —CONH$_2$, —CONR'$_2$, —COR' or SOOR', etc., wherein R' is as defined above. Illustrative of the substituents having a zero para-sigma value or a positive para-sigma value of less than about 0.4, and therefore excluded from the radicals designated by $Z_1$ when Z designates an alkyl radical, are hydrogen and halogen atoms and the phenyl ($-C_6H_5$) radical.

As typical of the ethylenically unsaturated monomers which can be polymerized in accordance with the process of this invention there can be mentioned the following: ethylene; acrylyl and alkylacrylyl compounds, particularly acrylic, haloacrylic and methacrylic acids and esters and acrylyl and alkylacrylyl nitriles and amides, such as alpha-chloroacrylic acid, ethyl acrylate, cyanoethyl acrylate, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, chloroethyl methacrylate, acrylonitrile, methacrylamide, acrylamide, N,N-diethylacrylamide, diethylaminopropyl acrylamide, N-methoxy-methyl acrylamide and the like; vinyl and vinylidine halides, such as vinyl chloride, vinyl fluoride, vinylidene chloride, vinylidene fluoride, 1-fluoro-1-chloroethylene and the like; haloethylenes, such as chlorotrifluoroethylene, 1,1-dichloro-2,2-difluoroethylene and the like; vinyl esters of alkyl or haloalkyl carboxylic acids, such as vinyl acetate, vinyl chloroacetate, vinyl propionate, vinyl trimethylacetate, vinyl hexanoate, vinyl laurate, vinyl stearate and the like; N-vinyl imides, such as N-vinylphthalimide, N-vinylsuccinimide and the like; N-vinyllactams, such as N-vinylcaprolactam, N-vinylbutyrolactam and the like; vinyl aryls, such as styrene, vinylnaphthalene and the like; other vinyl derivatives such as methyl vinyl ketone, vinylpyridine, methyl vinyl sulfone and the like, etc. The ethylenically unsaturated monomers of this invention also include those compounds having a plurality of polymerizable ethylenic double bonds which are isolated with respect to each other, such as divinyl succinate, divinyl adipate, divinyl benzene and the like. Also contemplated in this connection are compounds having one or more of the isolated ethylenic groups conjugated with a carboxylic group, such as vinyl acrylate, vinyl methacrylate, methacrylic anhydride, acrylic and substituted acrylic esters of polyhydric alcohols, such as ethylene glycol dimethacrylate, diethylene glycol dimethacrylate, triethylene glycol dimethacrylate, tetraethylene glycol dimethacrylate, diethylene glycol diacrylate, glyceryl triacrylate, polyethylene glycol dimethacrylates and the like. Of the ethyenically unsaturated monomers mentioned above, ethylene, the haloethylenes, the vinyl and vinylidene halides, the vinyl aryls, the acrylic, haloacrylic and methacrylic acids and esters, the acrylyl and alkylacrylyl nitriles and amides and the vinyl esters of alkyl and haloalkyl carboxylic acids represent preferred monomers due to their ease of polymerization.

In addition, it is to be noted that monomeric mixtures containing two or more of the above-mentioned ethylenically unsaturated monomers can also be employed in accordance with this invention when a copolymeric product is desired. For example, among the copolymers that can be obtained when the process of this invention is employed using mixtures of the ethylenically unsaturated monomers there can be mentioned the copolymers of vinyl chloride with ethylene, cyanoethyl acrylate, vinyl acetate, acrylonitrile, vinyl stearate, vinylidene chloride, vinyl fluoride or methyl methacrylate; the copolymers of vinyl acetate, with decyl acrylate, acrylonitrile, vinylidene chloride or methyl methacrylate; the copolymers of butyl acrylate with acrylamide, acrylonitrile or vinyl stearate; the copolymers of acrylamide with diethylaminopropylacrylamide; the copolymers of methacrylic acid with ethylene glycol dimethacrylate; the copolymers of styrene with acrylonitrile, and the like.

The function of the organoboron compounds herein described being that of a catalyst, any catalytic amount thereof can be used in the process of this invention. Most frequently, however, the organoboron catalyst is employed in a concentration of from about 0.03 percent to be about 5 percent by weight based upon the weight of the ethylenically unsaturated monomers(s) present in the polymerization mixture, with the use of a catalyst concentration of from about 0.1 percent to about 3 percent by weight based on the weight of the ethylenically unsaturated monomer(s) being preferred. Somewhat lower catalyst concentrations can also be employed effectively, while the upper limit of catalyst concentration is merely one of economic consideration.

The process of this invention is preferably carried out at a temperature in the range of from about 30° C. to about 100° C. The optimum temperatures for a particular polymerization, however, may vary within the broad range of from about 0° C. to about 200° C., depending upon the ethylenically unsaturated monomer(s) employed. Somewhat higher or lower polymerization temperatures can also be used.

The reaction period and pressure can also be varied broadly in accordance with the process of this invention. Thus, superatmospheric, subatmospheric or atmospheric pressures can be employed with good results so long as there is a sufficient concentration of monomer present. The polymerization can most conveniently be carried out at the autogenous pressures created in the reaction equipment that is employed, up to pressures of from about 50 atmospheres to about 3,000 atmospheres, and can be conducted in a continuous manner in an agitator-equipped vessel at atmospheric pressure or at an elevated pressure in a tubular reactor such as that conventionally employed for the polymerization of ethylene. Alternatively, the polymerization can be conducted batchwise in a sealed autoclave or in any other convenient manner. The reaction period can vary from as little as five minutes or less, up to several days if desired. The longer the reaction period, of course, the more complete the polymerization, i.e. conversion of monomer to polymer.

In addition, the process of this invention can be carried out by bulk, suspension, emulsion or solution methods of polymerization, i.e. with or without a diluent. When a diluent is employed, it can serve as a solvent or simply as a suspending medium for either the catalyst, the reactant monomer(s) or the polymer product. By way of illustration, the polymerization can be carried out in water in the presence of suspending or emulsifying agents such as esters of sulfonated dicarboxylic acids, e.g. dioctyl sodium sulfosuccinate (Aerosol OT) etc. Other organic diluents which can be used include alcohols, ketones, saturated aliphatic and aromatic hydrocarbons, ethers, alkyl and aryl halides, nitriles, amides, esters and the like. As typical of the suitable organic diluents there can be mentioned the following: methanol, acetone, heptane, toluene, benzene, diethyl ether, tetrahydrofuran, propylene oxide, ethylene dichloride, chlorobenzene, acetonitrile, dimethylformamide, ethyl acetate and the like. However, as noted previously it is not necessary that a diluent be present. The polymerization of vinyl chloride, for example, can be carried out efficiently in bulk or as a suspension or slurry in heptane. Thus, it will be apparent that the amount of diluent employed can be varied broadly in accordance with this invention. In general, however, it is desirable to have at least 1 percent by weight of monomer present in the diluent when the latter is employed, although this restriction is again one of economic consideration.

Substantially anhydrous conditions are preferred since the organoboron compounds contemplated as catalysts by this invention react with water or alcohols to form alkylboronic acid or its esters, respectively. However, it has been found that the acids and esters formed upon hydrolysis or alcoholysis of the organoboron compound are also vinyl polymerization catalysts.

Upon completion of the polymerization, the polymeric product that is formed can be recovered by any convenient method known to those skilled in the art, such as by precipitation, centrifugation, etc. When in solution, the polymer may be precipitated, for example, by addition to an alcohol such as methanol, filtered and dried. Alternatively, when the polymeric product is formed as a solid, e.g. in a non-solvent environment, the product can be centrifuged or simply filtered and dried, the precipitation step being omitted. A polymeric product is thus obtained substantially free from any contaminating residue.

As employed herein the term "polymerization" includes within its scope the polymerization of a single monomer and the copolymerization of two or more monomers. Further, the term "polymer," unless otherwise indicated, refers herein to both homopolymers and copolymers, i.e. polymers produced from two or more monomers. The term "reduced viscosity" is well known in the art and designates a value obtained by dividing the specific viscosity of a solution of the polymer by the concentration of the polymer in the solution, the concentration being measured in grams of polymer per 100 milliliters of solvent; the specific viscosity is obtained by dividing the difference between the viscosity of the polymer solution and the viscosity of the pure solvent by the viscosity of the solvent. The reduced viscosity of a polymer is regarded as a measure of the molecular weight of the polymer, with higher values indicating higher molecular weights.

The invention can be illustrated further by the following specific examples of its practice but is not intended to be limited thereto. In the examples, the reduced viscosities were measured from polymer solutions containing 0.2 gram of polymer per 100 milliliters of solvent.

EXAMPLE 1

Twenty milliliters of methyl methacrylate and 0.5 milliliter of tri-n-butylboroxine were charged into a polymerization tube that had been purged with nitrogen. The tube was subsequently capped and agitated in a water bath at a temperature of 50° C. for a period of 24 hours. A poly(methyl methacrylate) product was formed. The polymer was then precipitated by adding the contents of the cooled polymerization tube to about 100 milliliters of methanol. The precipitated polymer was filtered, washed with methanol and dried. The yield and reduced viscosity of the poly(methyl methacrylate) product thus recovered are given below in Table I.

EXAMPLES 2–5

These examples were run in the same manner as that described in Example 1 utilizing, however, different ethylenically unsaturated monomers, so as to form: poly(vinyl acetate) in Example 2; polystyrene in Example 3; poly(vinyl chloride) in Example 4; and polyacrylonitrile in Example 5. The yields and reduced viscosities of the polymers produced are also given below in Table I.

Table I

| Example | Monomer | Yield (percent) | Reduced [1] Viscosity |
|---|---|---|---|
| 1 | Methyl Methacrylate | 96 | 4.1 |
| 2 | Vinyl Acetate | 97 | 1.1 |
| 3 | Styrene | 11 | 1.3 |
| 4 | Vinyl Chloride | 40 | 1.2 |
| 5 | Acrylonitrile | 12 | 32 |

[1] Reduced viscosities of the dried polymers were determined at 30° C. in cyclohexanone for poly(vinyl chloride), in dimethylformamide for polyacrylonitrile, and in benzene for the other polymers.

EXAMPLE 6

A 1.5 liter stainless steel autoclave fitted with a mechanical stirrer was charged with 200 grams of heptane and 1.2 grams of tri-n-butylboroxine. Air was excluded by maintaining a nitrogen purge. The solution was heated to 150° C., and 520 grams of ethylene were added to a pressure of 20,000 pounds per square inch. After a reaction period of 1.9 hours, the reactor was cooled and the unreacted ethylene was vented. The polyethylene formed was washed with methanol and dried at 50° C. in a current of air. Thirty-four grams of polyethylene was recovered (6.5 percent conversion) having a melt index of 10,000 decigrams per minute, and a density of 0.940 gram per cubic centimeter.

This is a continuation-in-part of copending application Serial No. 771,748, filed November 4, 1958, now abandoned.

The invention is broadly susceptible of modification within the scope of the appended claims.

What is claimed is:

1. A process for the polymerization of ethylenically unsaturated monomers having the general formula

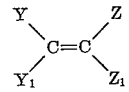

wherein Y and $Y_1$ each designates a hydrogen atom, Z designates a member of the group consisting of hydrogen atoms, halogen atoms and the alkyl radicals containing from 1 to 4 carbon atoms, $Z_1$ designates a substituent having a Hammett para-sigma value of from zero to about 1.3 and, wherein when Z designates an alkyl radical, $Z_1$ designates a substituent having a positive para-sigma value of at least about 0.4, which process comprises contacting said ethylenically unsaturated monomers, at a temperature of from about 0° C. to about 200° C., with a catalytic quantity, sufficient to polymerize said ethylenically unsaturated monomers, of an organoboron compound having the general formula

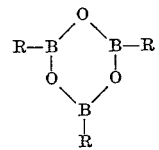

wherein R designates an alkyl radical containing from 1 to 12 carbon atoms.

2. The process of claim 1 wherein the temperature is from about 30° C. to about 100° C.

3. The process of claim 2 wherein the ethylenically unsaturated monomer is methyl methacrylate.

4. The process of claim 2 wherein the ethylenically unsaturated monomer is vinyl acetate.

5. The process of claim 2 wherein the ethylenically unsaturated monomer is acrylonitrile.

6. The process of claim 2 wherein the ethylenically unsaturated monomer is vinyl chloride.

7. The process of claim 2 wherein the ethylenically unsaturated monomer is styrene.

8. The process of claim 2 wherein the organoboron compound is tri-n-butylboroxine.

9. A process for the production of poly(methyl methacrylate) which comprises contacting methyl methacrylate with from about 0.03 percent to about 5 percent by weight based upon said methyl methacrylate of tri-n-butylboroxine, at a temperature of from about 30° C. to about 100° C.

10. A process for producing poly(styrene) which comprises contacting styrene with from about 0.03 percent to about 5 percent by weight based upon said styrene of tri-n-butylboroxine, at a temperature of from about 30° C. to about 100° C.

11. A process for producing poly(vinyl acetate) which comprises contacting vinyl acetate with from about 0.03 percent to about 5 percent by weight based upon said vinyl acetate of tri-n-butylboroxine, at a temperature of from about 30° C. to about 100° C.

12. A process for producing poly(acrylonitrile) which comprises contacting acrylonitrile with from about 0.03 percent to about 5 percent by weight based upon said acrylonitrile of tri-n-butylboroxine, at a temperature of about 30° C. to about 100° C.

13. A process for producing poly(vinyl chloride) which comprises contacting vinyl chloride with from about 0.03 percent to about 5 percent by weight based upon said vinyl chloride of tri-n-butylboroxine, at a temperature of about 30° C. to about 100° C.

References Cited in the file of this patent

Furukaawa et al.: Die Makromolekulare Chemie, vol. 31, pages 122–139 (1959).

Gould: Mechanism and Structure in Organic Chemistry, Henry Holt and Company, Inc., New York (1959), pages 220–227.